United States Patent
Suzuki

[11] Patent Number: 5,995,147
[45] Date of Patent: Nov. 30, 1999

[54] COMMUNICATION METHOD, TRANSMISSION APPARATUS, TRANSMISSION METHOD, RECEIVING APPARATUS AND RECEIVING METHOD

[75] Inventor: Mitsuhiro Suzuki, Chiba, Japan

[73] Assignee: Sony Corporation, Tokyo, Japan

[21] Appl. No.: 08/910,662

[22] Filed: Aug. 13, 1997

[30] Foreign Application Priority Data

Aug. 23, 1996 [JP] Japan ..................... 8-222933

[51] Int. Cl.$^6$ ....................................... H04N 7/12
[52] U.S. Cl. .................. 348/385; 348/469; 348/388; 348/725; 348/720
[58] Field of Search .................. 348/469, 423, 348/385, 388, 723, 724, 725, 726, 729, 728, 720; 370/464, 535, 537; 375/267, 299, 347; 329/304, 307; 371/37.5; H04N 7/12

[56] References Cited

U.S. PATENT DOCUMENTS

| | | | |
|---|---|---|---|
| 5,291,289 | 3/1994 | Hulyalkar et al. | 348/469 |
| 5,305,353 | 4/1994 | Weerackody | 375/100 |
| 5,442,398 | 8/1995 | Koshiro et al. | 348/385 |
| 5,504,528 | 4/1996 | Koshiro et al. | 348/385 |
| 5,541,552 | 7/1996 | Suzuki et al. | 329/307 |
| 5,636,242 | 6/1997 | Tsujimoto | 375/267 |
| 5,715,280 | 2/1998 | Sandberg et al. | 375/260 |
| 5,751,716 | 5/1998 | Tzannes et al. | 370/468 |
| 5,825,807 | 10/1998 | Kumar | 375/200 |
| 5,848,097 | 12/1998 | Carney et al. | 375/219 |
| 5,862,133 | 1/1999 | Schilling | 370/342 |

*Primary Examiner*—John K. Peng
*Assistant Examiner*—Jean W. Désir
*Attorney, Agent, or Firm*—Jay H. Maioli

[57] ABSTRACT

A receiving process is realized with a simple configuration when a plurality of sources such as in the television broadcasting or the like are transmitted efficiently at the same time. A plurality of transmission bands are prepared each including a predetermined number of subcarriers arranged at a predetermined frequency interval. The signal of each transmission band is delimited at a predetermined time interval to form a time slot. For transmitting a plurality of data A to P, after individual data are transmitted during a predetermined time slot period using a predetermined transmission band, the transmission band is switched to the separate transmission band and the particular individual data is transmitted during a predetermined time slot period. The receiving band is switched at the receiving side in an interlinked relation with the switching of the transmission band for transmitting the desired data.

6 Claims, 8 Drawing Sheets

COMMUNICATION METHOD, TRANSMISSION APPARATUS, TRANSMISSION METHOD, RECEIVING APPARATUS AND RECEIVING METHOD

BACKGROUND OF THE INVENTION

1. Field of the Invention

The present invention relates to a communication method suitably applied to television broadcasting, for example, as well as to a transmission method, a transmission apparatus, a receiving method and a receiving apparatus.

2. Description of the Related Art

For carrying out a television broadcasting efficiently, what is called a digital television broadcasting has been put to practical use in which a video program conformed of a video signal, its associated audio signal and so on is converted to digital data and then transmitted. According to this digital television broadcasting, a number of video programs can be transmitted at the same time within a narrow transmission band, and a transmission band prepared for the television broadcasting can be used at high efficiency.

Figure 1:
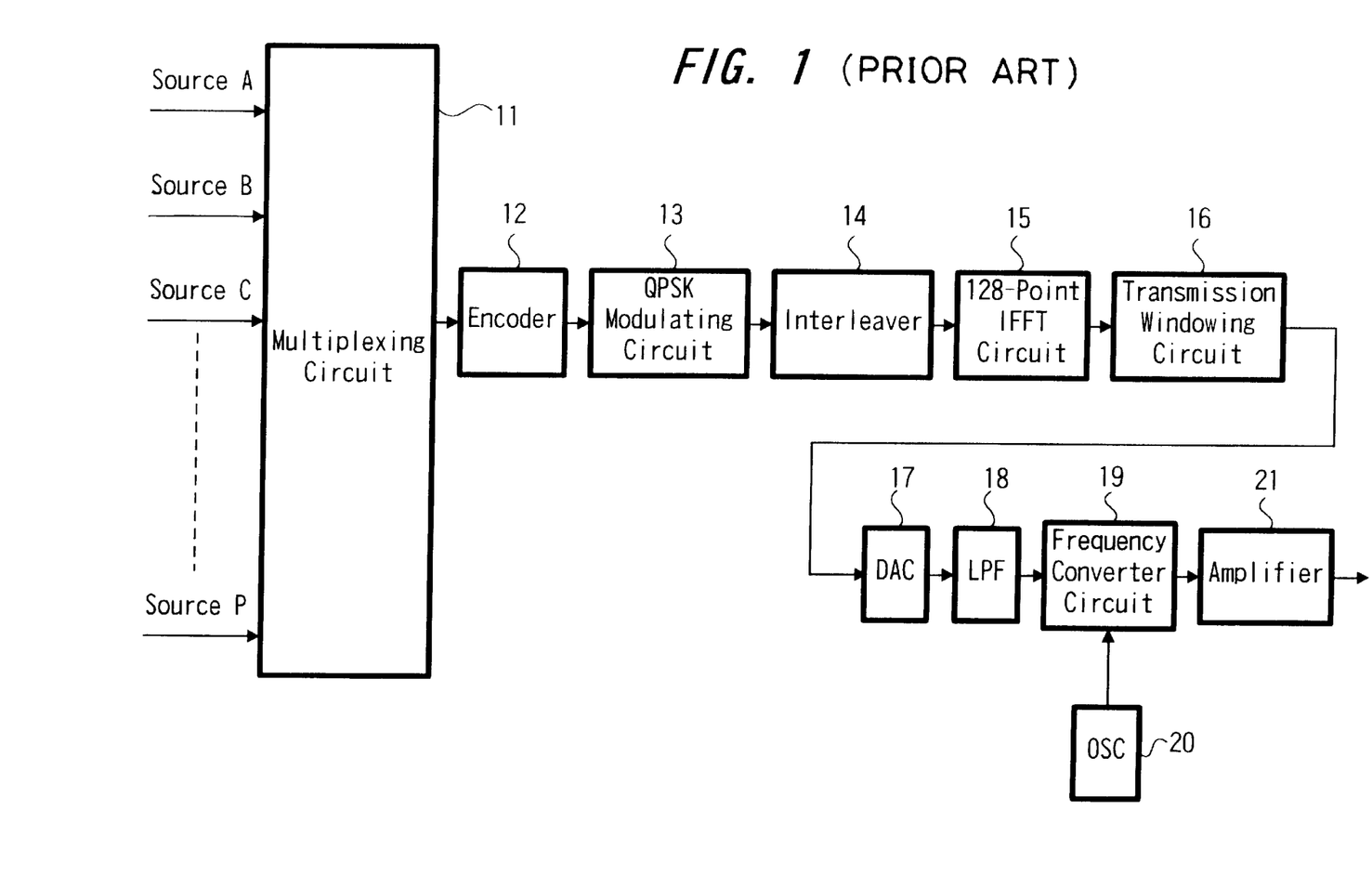
FIG. 1 is a block diagram showing an example configuration for transmission process of a digital broadcasting wave by a conventional multicarrier.

FIG. 1 is a diagram showing an example of a transmission arrangement used at a conventional transmitting station for transmitting a digital television broadcasting wave. Sources A, B, . . . , P, each being formed of an individual video program converted to respective digital data, are multiplexed in a multiplexing circuit 11 by a predetermined method. The signal thus multiplexed is encoded by an encoder 12 for transmission, and the output of the encoder 12 is phase-modulated by a QPSK modulation circuit 13 for transmission. Depending on a system configuration, the process up to the encoding by the encoder may be executed independently for each source and the output of the encoder may be multiplexed.

The signal modulated by the encoder 12 is supplied to an interleaver 14 which carries out an interleaving process to produce data over a predetermined section. The output of the interleaver 14 is applied to an inverse fast Fourier transform (IFFT) circuit 15 for producing a multicarrier signal by inverse fast Fourier transform. For example, a 128-point IFFT circuit 15 is used to arrange 64 carriers at a predetermined frequency interval and transmission data is modulated to be distributed over the respective carriers as a multicarrier signal.

The multicarrier signal output from the IFFT circuit 15 is supplied to a transmission windowing circuit 16 for multiplying a windowing data for transmission. The signal thus windowed is supplied to a digital/analog converter 17 and converted into an analog signal thereby. The output thus converted is supplied through a low-pass filter 18 to a frequency conversion circuit 19. This frequency conversion circuit 19 changes the frequency to a predetermined transmission frequency by multiplying the input with a signal output from an oscillator 20. The signal thus frequency-converted is supplied to a radio-frequency transmission circuit such as an amplifier 21 and so on to be subjected to a transmission process and then transmitted in a wireless fashion.

Figure 8:
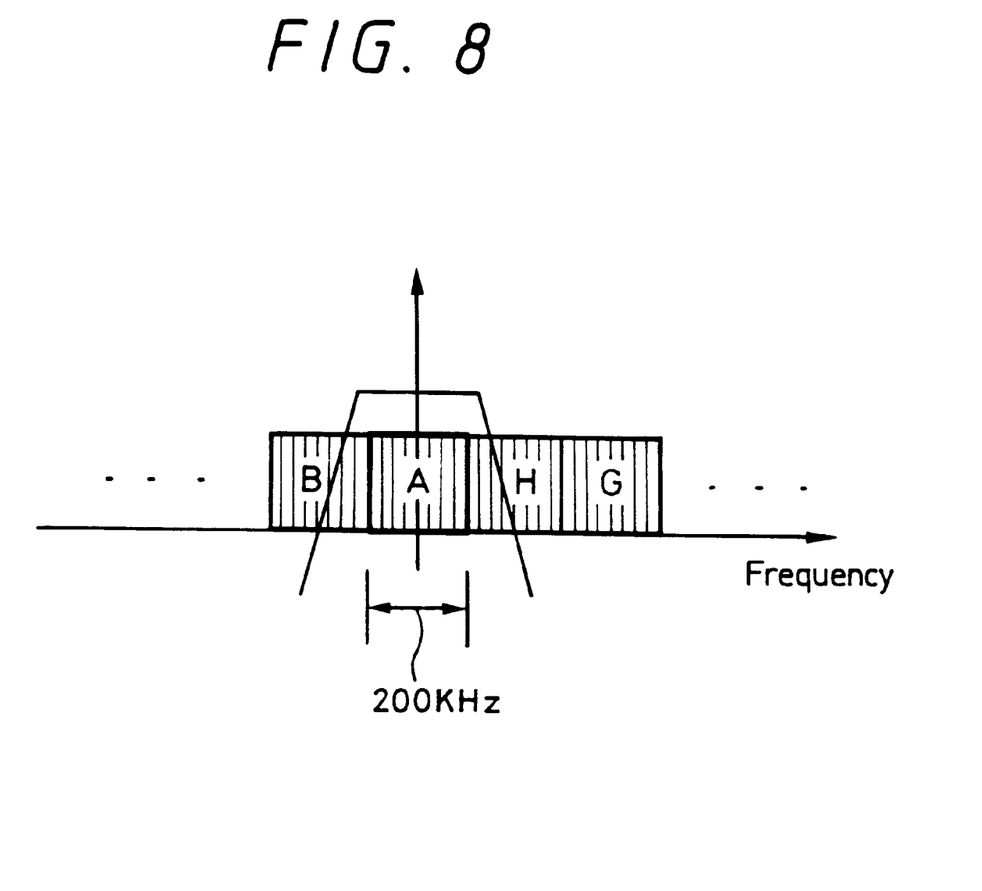
FIG. 8 is a diagram for explaining the frequency allocation of a receiving signal according to the embodiment.

The transmission signal generated by the above process, as shown in FIG. 8, for example, is transmitted as a multicarrier signal in which a great number of carriers are arranged in one transmission band, and the data from the respective sources are distributed to the respective carriers within one transmission band and then transmitted. In this case, as the band width of one transmission band, if the number of sources to be transmitted at a time is many, a large number of frequency band widths are required.

Figure 2:
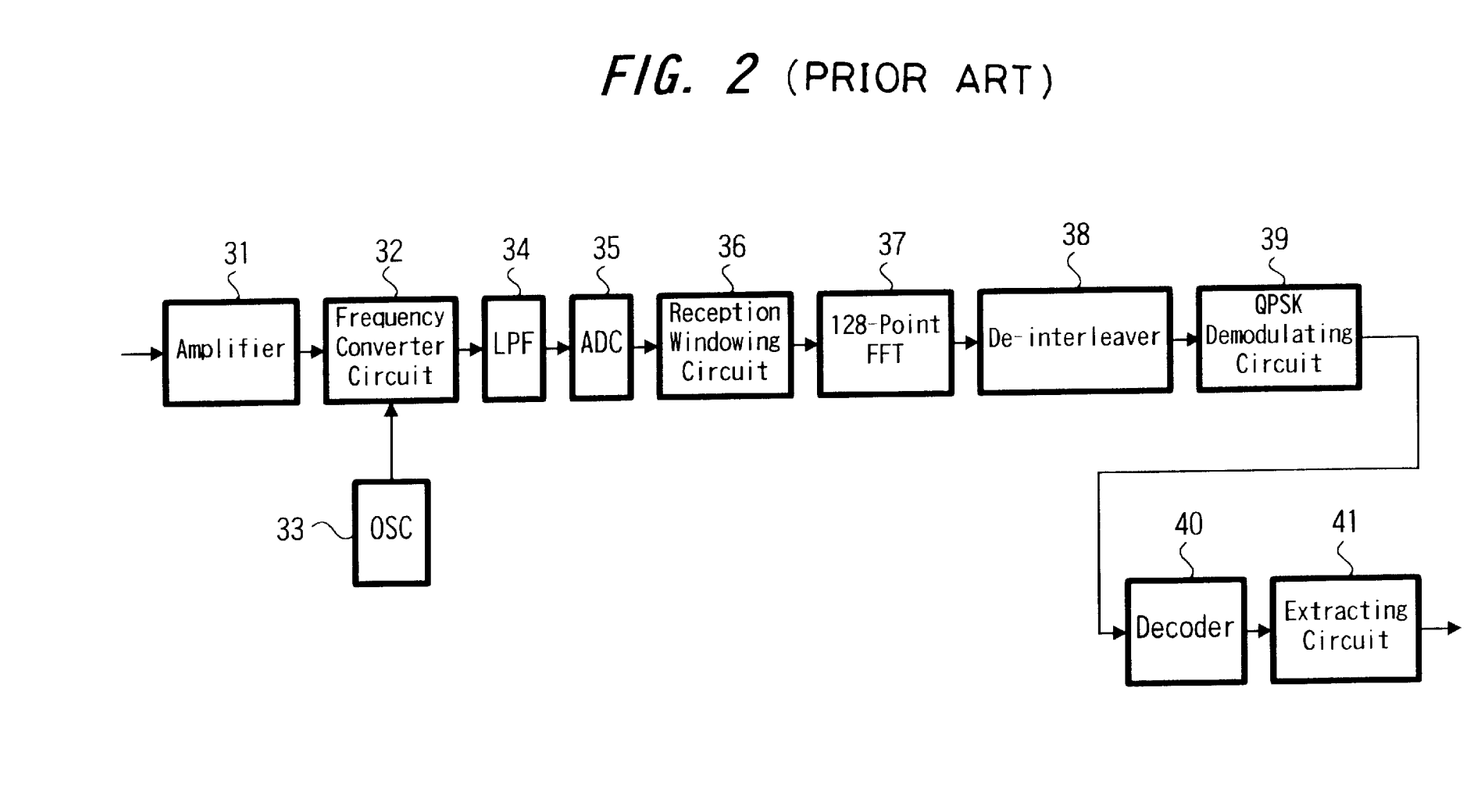
FIG. 2 is a block diagram showing an example configuration for the process of receiving a digital broadcasting wave by a conventional multicarrier.

Now, a configuration for receiving the broadcast wave transmitted with the configuration shown in FIG. 1 will be explained with reference to FIG. 2. An output of a receiving amplifier 31 connected to a receiving antenna or the like is supplied to a frequency conversion circuit 32, in which a signal in a predetermined transmission band (the frequency band converted by the frequency conversion circuit 19 at the transmitting side) is converted into an intermediate frequency signal based on the output of an oscillator 33, and the resulting intermediate frequency signal is supplied to an analog/digital converter 35 through a low-pass filter 34 thereby to produce digital data sampled at a predetermined sampling frequency.

The data thus sampled is multiplied by windowing data at a receiving windowing circuit 36 inverse to that used for the transmission. The data thus multiplied is supplied to an FFT (fast Fourier transform) circuit 37 where the multicarrier signal is restored into single-system data by the fast Fourier transform. For example, a multicarrier signal associated with 64 carriers is restored into single-system data using a 128-point FFT circuit 37. The data thus subjected to the fast Fourier transform is supplied to a deinterleaver 38 for restoring the data interleaved at the transmitting side into the original arrangement. Thereafter, the signal is supplied to a QPSK demodulation circuit 39 for demodulation thereby to produce a receiving symbol. The receiving symbol thus demodulated is decoded at a decoder 40 thereby to produce receiving data. This receiving data contains the data of all the sources multiplexed at the transmitting side. A desired source is extracted by a predetermined extraction circuit 41, and the data of the source thus extracted (the video signal and the audio signal) is supplied to a video equipment such as a television receiver or the like.

By performing the transmission and the receiving processes in this way, a plurality of video programs can be efficiently transmitted by the digital data in the form of a multicarrier signal.

Figure 3:
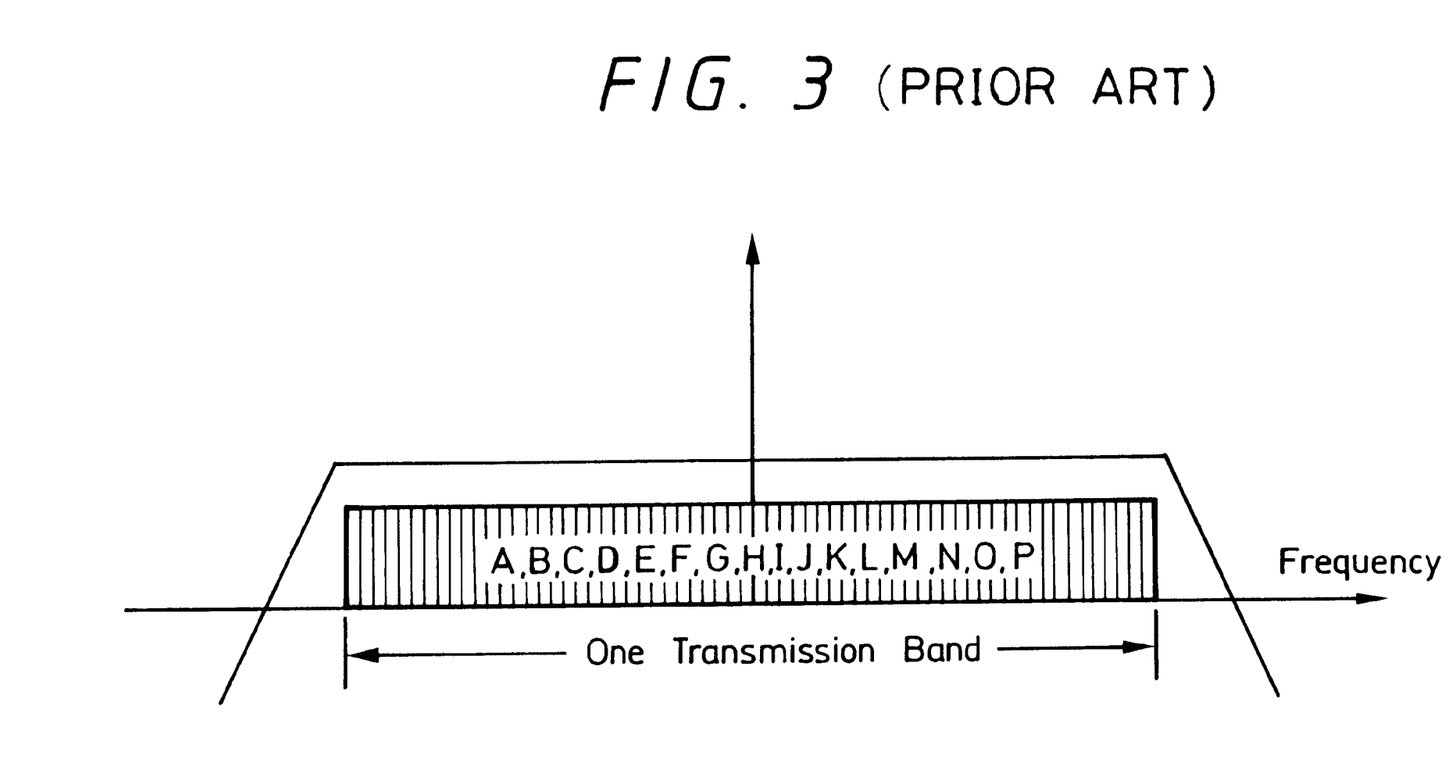
FIG. 3 is a diagram showing an example of the frequency allocation of a digital broadcasting wave by a conventional multicarrier.
Figure 4:
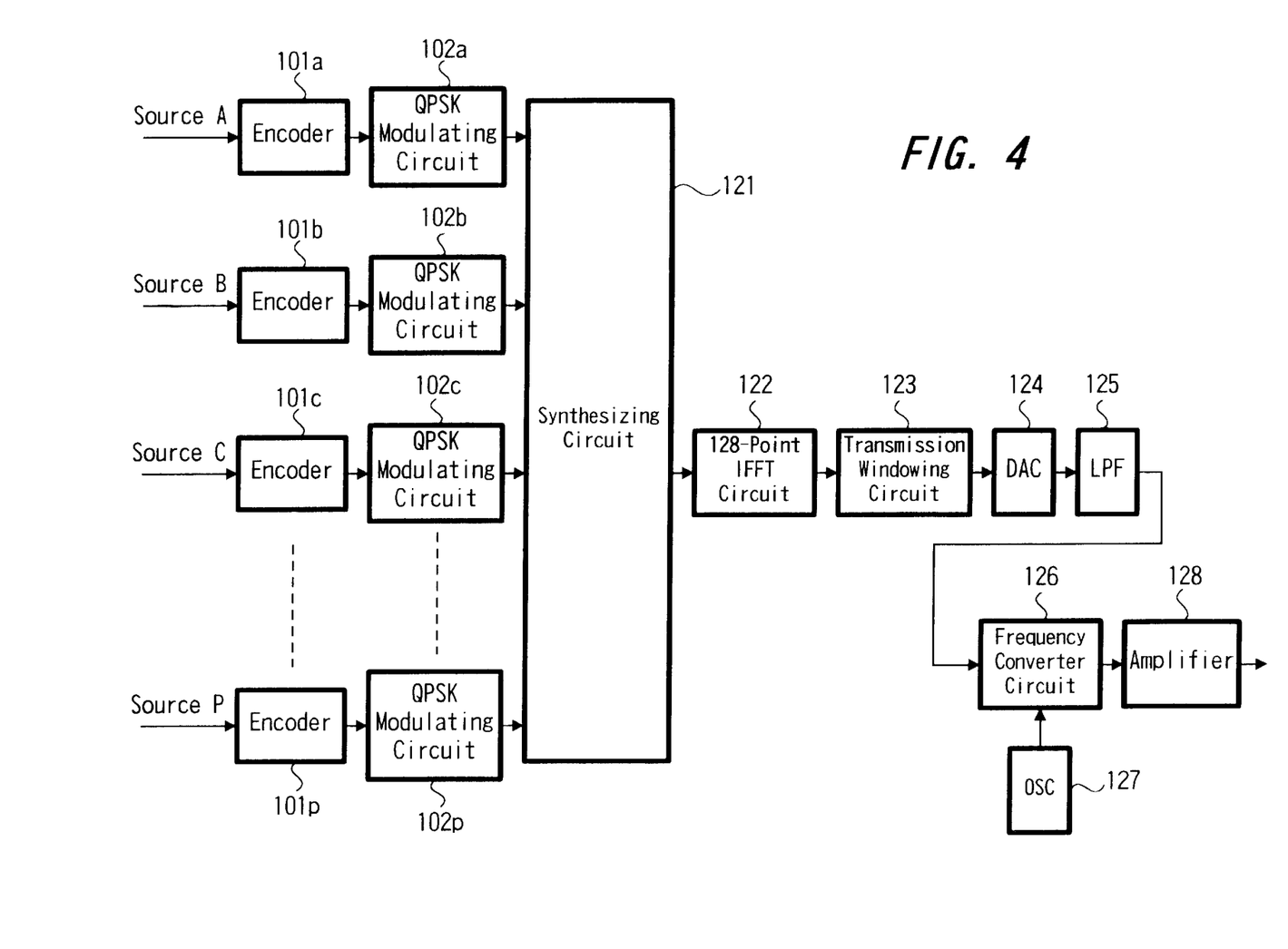
FIG. 4 is a block diagram showing a configuration for transmission process according to an embodiment of the present invention.

In the case where a television broadcast wave is transmitted with the configuration described with reference to FIGS. 1 and 2, however, the burden on the circuit at the receiving side is inconveniently very great. Specifically, in the case of the conventional transmission with a multicarrier signal, all the video programs prepared are distributed uniformly to the respective carriers and then transmitted. In the receiving apparatus shown in FIG. 2, therefore, the circuits up to the decoder 40 are required to handle the signals in all the bands transmitted. As the low-pass filter 34, for example, a filter having a pass band to extract all of one transmission band shown in FIG. 3 is required. Also, the FFT circuit 37 is required to convert all the multiplexed carriers, and the deinterleaver 38 is required to carry out such a deinterleaving process to store all the multiplexed data and change the sequence thereof. Further, the demodulation circuit 39 is required to demodulate all the data multiplexed.

The data actually required at the receiving side, however, is only one arbitrary video program contained in the multiplexed data. It is therefore wasteful to receive and process all the data, and the circuit of the receiving system is unnecessarily enlarged in scale.

SUMMARY OF THE INVENTION

In view of such aspects, it is an object of the present invention to realize a receiving process with a simple configuration when a plurality of sources are transmitted at the same time and efficiently in a television broadcasting or the like.

According to a first aspect of the present invention, a transmission method using a multi-carrier signal modulated in units of sub-band which consists of subcarriers of a predetermined number, modulated by plural desired informations, includes an interleaving step for interleaving data in a frequency domain only in said sub-band.

According to a second aspect of the present invention, a receiving method using a multi-carrier signal modulated in units of sub-band and a time slot which consist of subcarriers of a predetermined number and subslots thereof, respectively, modulated by plural desired informations, includes a de-interleaving step of de-interleaving data in a time domain only in said time slot after receiving said multi-carrier signal.

According to a third aspect of the present invention, a transmission apparatus transmitting a multi-carrier signal modulated in units of sub-band which consists of subcarriers of a predetermined number and modulated by plural desired informations, includes an encoding means for encoding each plural desired information, a modulating means for modulating an output signal form said encoding means, a first processing means for interleaving an output signal from said modulating means in a frequency domain only in said sub-band, and an inverse fast Fourier transforming means for subjecting an output signal from said first processing means to an inverse fast Fourier transform to thereby generate a multi-carrier signal.

According to a fourth aspect of the present invention, a receiving apparatus receiving a multi-carrier signal modulated in units of sub-band which consists of subcarriers of a predetermined number and modulated by a plurality of desired informations, includes a fast Fourier transforming means for subjecting a received multi-carrier signal to a fast Fourier transform, a first processing means for de-interleaving an output signal from said fast Fourier transforming means in a frequency domain only in said sub-band, a demodulating means for demodulating an output signal from said first processing means, and a decoding means for decoding an output signal from said demodulating means.

DESCRIPTION OF THE PREFERRED EMBODIMENT

An embodiment of the present invention will be explained below with reference to FIGS. 4 to 8.

This embodiment is applied to a television broadcast transmission system for transmitting a plurality of video programs (the video program mentioned here is assumed to include not only a video signal but an audio signal associated therewith) at the same time. First, a configuration of a communication system to which the present embodiment is applicable will be explained. The communication system according to this embodiment is configured as what is called a multicarrier system in which a plurality of subcarriers are contiguously arranged within a band (Band) assigned beforehand, and a single transmission path (Path) is used by the subcarriers at the same time in the particular one band. Further, a plurality of the subcarriers in one band are collectively divided (Division) and modulated by band. This process will be herein called a band division multiple access BDMA:Band Division Multiple Access).

Figure 5:
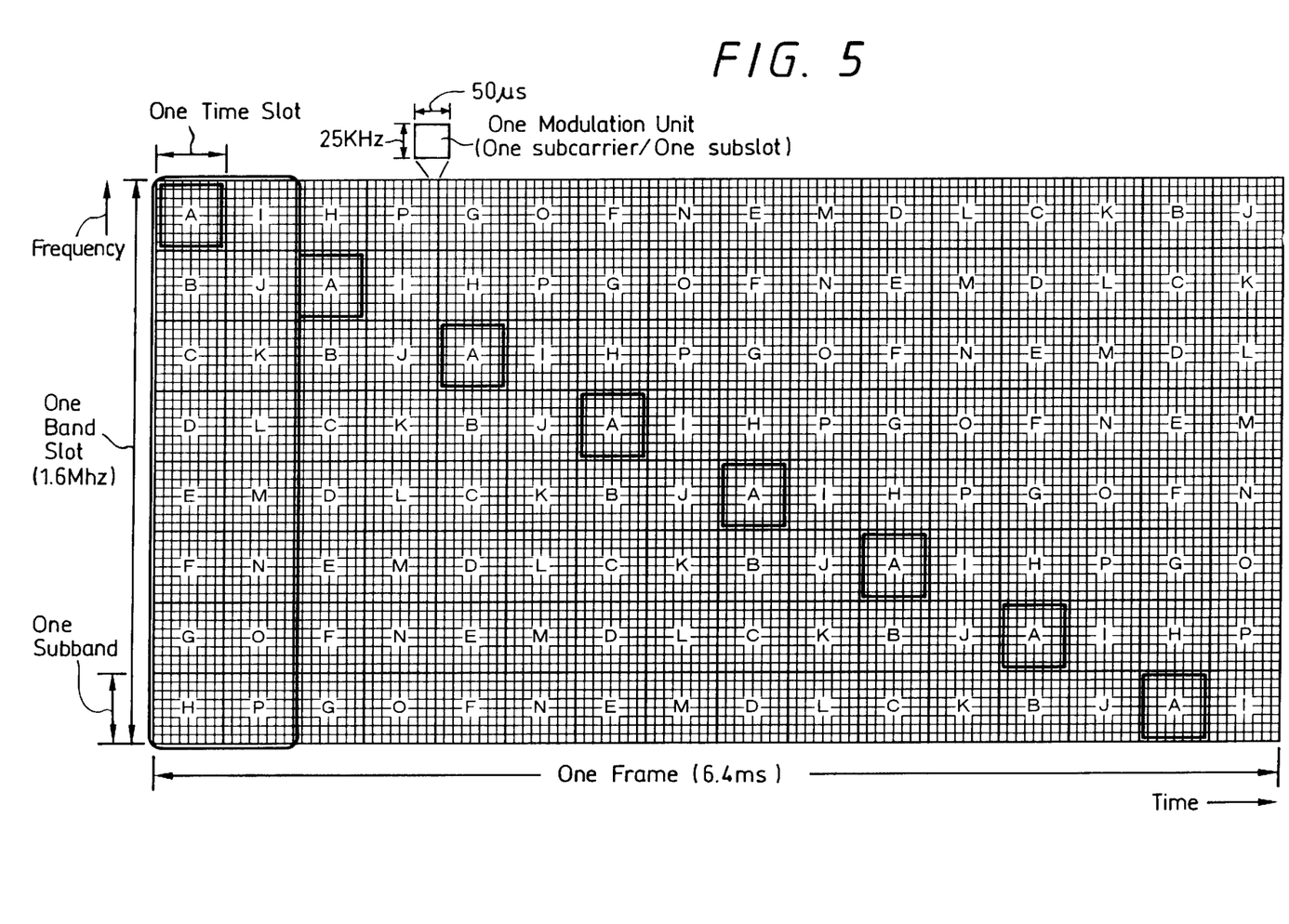
FIG. 5 is a diagram for explaining the assignment of each program to an actual signal according to the embodiment.

FIG. 5 is a diagram showing an assignment of a plurality of video programs on actual signals. The ordinate represents a frequency, and the abscissa represent a time. In this case, a 1.6-MHz band is provided for one band slot, and 64 subcarriers are arranged at a 25-kHz interval within the 1.6-MHz band. In this case, eight sub-bands are formed where contiguous eight subcarriers are made as a unit. One subslot by one subcarrier is assumed to be 50 µs, eight subslots constitute one time slot, and sixteen time slots make up one frame. One frame represents a duration of 6.4 ms.

In this example, sixteen video programs A, B, C, . . . , P are adapted for simultaneous transmission. The time slots for transmission are set alternately between former-half eight programs A to H and the latter-half programs I to P.

The eight subbands within one time slot are adapted to transmit separate video programs, respectively. Specifically, the eight programs A to H are transmitted individually in the eight subbands, respectively, constituting a first one time slot period shown in FIG. 5, and the eight programs I to P are transmitted individually in the eight subbands, respectively, making up the next one time slot period. The same process is repeated subsequently. The video programs which use the sub-bands within one time slot period are switched sequentially by one sub-band. The video program A defined in FIG. 5, for example, is assigned to the sub-band of the highest frequency during the first time slot period, and the sub-band of the next highest frequency during the next time slot period but one. Subsequently, the pause for one time slot is alternated with the transmission for one time slot while at the same time sequentially changing the sub-band for transmission. The other video programs are subjected to a similar change in one frame. The same assignment as shown in FIG. 2 is set for the next frame period.

Figure 6:
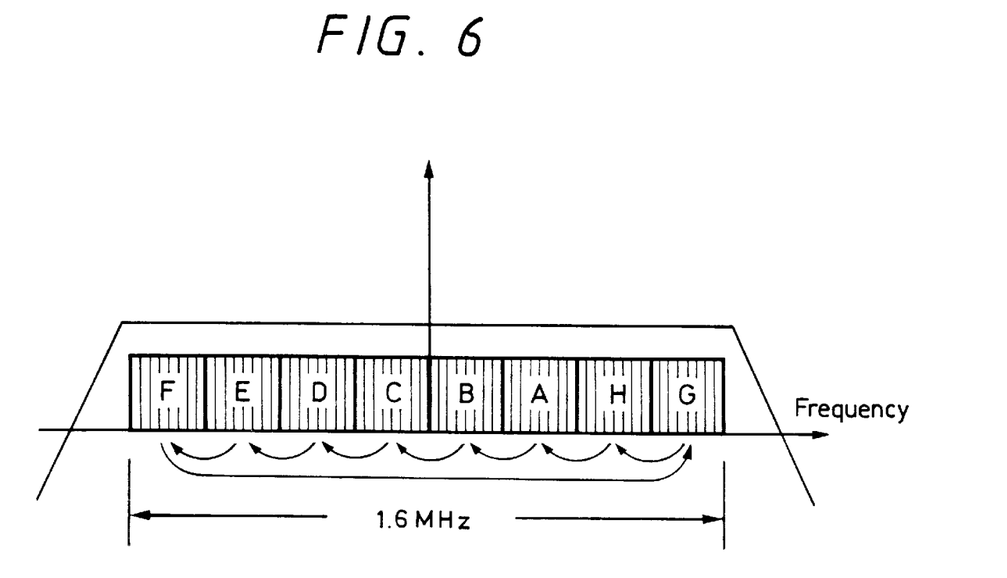
FIG. 6 is a diagram for explaining the frequency allocation of a transmission signal according to the embodiment.

By setting this way, the transmission signal frequencies are allocated in such a manner that during the fifth time slot period shown in FIG. 5, for example, the video programs G, H, A, B, C, D, E, F are arranged in the descending order of frequency in one sub-band as shown in FIG. 6. As indicated by arrows in FIG. 3, the sub-bands used for the video programs are changed sequentially in each time slot period.

A configuration will be explained for transmission with the arrangement described above. First, the configuration at a transmitting side will be explained with reference to FIG. 4. Sixteen sources A, B, . . . , P each being formed of an individual program are supplied independently to encoders 101a, 101b, . . . , 101p, respectively, to form predetermined encoded data. The outputs of the encoders 101a, 101b, . . . , 101p are supplied individually to QPSK modulation circuits 102a, 102b, . . . , 102p, respectively, thereby to produce predetermined transmission symbols. The transmission symbols for the respective sources are supplied to a synthesis circuit 121 and are synthesized into one system data. At the time of synthesis by the synthesis circuit 121, the data are subjected to an interleaving process to rearrange the order of respective data simultaneously. In the interleaving process, the data are interleaved over a plurality of frames. The respective sources A to P, however, are always arranged at the respective program positions described in FIG. 2. In the synthesis stage of the synthesis circuit 121, however, a multicarrier signal has not yet been formed, but a corresponding arrangement is realized at the time of transformation in an IFFT circuit at the next stage.

The output of the synthesis circuit 121 is supplied to an inverse fast Fourier transform (IFFT) circuit 122 where the transformation on time base and on frequency base are performed by inverse fast Fourier transform thereby to produce a multicarrier signal. In the case under consideration, a 128-point IFFT circuit is used to the arrange 64 carriers in one band slot at a 25-kHz intervals in each band slot as shown in FIG. 5.

The multicarrier signal output from the IFFT circuit 122 is supplied to a transmission windowing circuit 123 for multiplying a windowing data for transmission. The signal thus windowed is supplied to a digital/analog converter 124 to perform the corresponding conversion process. The conversion output is applied through a low-pass filter 125 to a frequency conversion circuit 126. The low-pass filter 125 executes the process of extracting the output of one band slot (1.6-MHz band) shown in FIG. 6. The frequency conversion circuit 126 mixes the frequency signal output from an oscillator 127 therewith thereby to frequency-convert the whole one band slot to a predetermined transmission frequency. The signal thus frequency-converted is supplied to a high-frequency transmission circuit such as an amplifier 128 or the like where the transmission process is performed for radio transmission.

Figure 7:
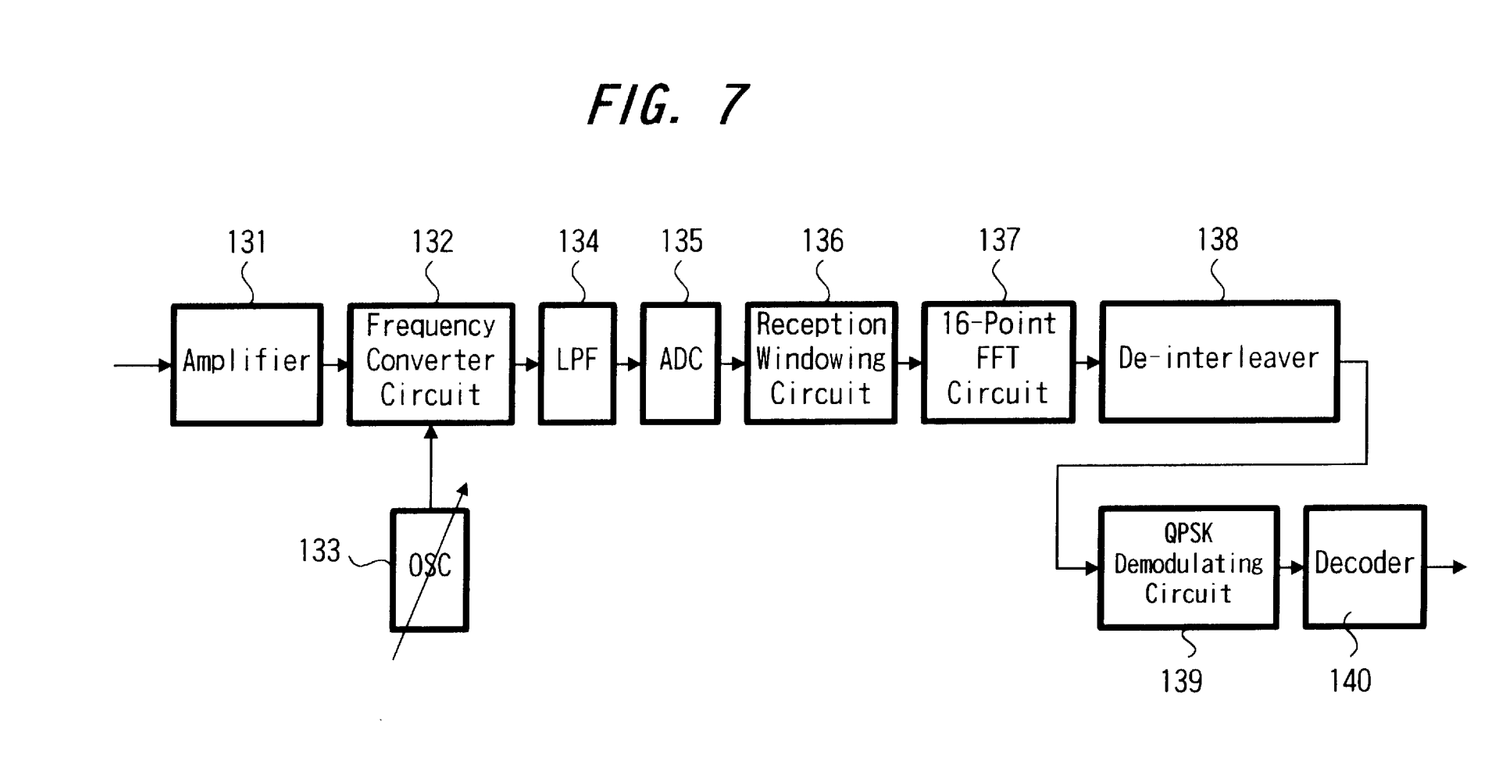
FIG. 7 is a block diagram showing a configuration for the receiving process according to the embodiment.

Next, a configuration for receiving the signal thus transmitted will be explained with reference to FIG. 7. The signal received by a receiving antenna is supplied to a high-frequency receiving circuit such as an amplifier 131 or the like, in which a corresponding receiving process is carried out and then, supplied to a frequency conversion circuit 132, where it is mixed with the frequency signal output from an oscillator 133 and frequency-converted to an intermediate frequency signal. In this case, a variable oscillator is employed as the oscillator 133. After a certain frequency is received during one time slot period, the frequency is switched during the next time slot period. The frequency thus switched is processed for receiving during the next time slot period. In this way, the frequency switching during a time slot period is alternated with the receiving process during the next time slot period. The frequency switching is accomplished in an interlinked with the frequency change (subband change) of a desired one of the 16 programs A to P shown in FIG. 2. Also, the timing of frequency switching and the timing of receiving are replaced with each other according to difference in a program number (i.e., the former-half programs A to H and the latter-half programs I to P).

The output of the frequency conversion circuit 132 is supplied to an analog/digital converter 135 through a low-pass filter 134. The low-pass filter 134, as shown in FIG. 5, extracts only the signal in a 200-kHz band constituting one subband. The analog/digital converter 135 samples the signal at a predetermined sampling frequency to provide a digital data and multiplies the sampled data by a windowing data inverse to that for transmission at a receiving windowing circuit 136. The data thus multiplied is supplied to an FFT (fast Fourier transform) circuit 137, where the time base is transformed into the frequency base by the fast Fourier transform thereby to restore the multicarrier signal to one system data.

In the case under consideration, a 16-point FFT circuit is used to restore the multicarrier signal formed of eight carriers constituting one sub-band into one system data. The data thus subjected to the fast Fourier transform is supplied to a deinterleaver 138 for restoring the original data arrangement, and the resulting data is applied to a QPSK demodulation circuit 139 for performing the demodulation process thereby to produce a receiving symbol. The receiving symbol thus demodulated is decoded by a decoder 140 thereby to produce a receiving data. The receiving data is supplied to a video equipment as a television receiver or the like.

The processing in this way carries out the receiving process for a subband containing only a required video program in the circuits including and subsequent to the frequency conversion circuit 132 at the time of receiving. Specifically, as shown in FIG. 8, only the 200-kHz band signal constituting one subband is processed for receiving, and only the data modulated to eight subcarries in the particular one sub-band and transmitted is demodulated. Consequently, it is sufficient that the analog/digital converter 135, for example, samples and processes the data in one sub-band, the low-pass filter 134 extracts only the 200-kHz band in one sub-band, and the FFT circuit 137 restores the multicarrier signal formed of eight carriers to one system data. Further, it is also sufficient that the deinterleaver 138 stores the data in one sub-band for a predetermined frame period and carries out the deinterleaving process. The same can be said of the demodulation by the QPSK demodulation circuit 139 and the decoding operation by the decoder 140.

For this reason, the burden on each circuit constituting the receiving apparatus is lightened greatly, thereby making it possible to reduce the circuit scale, as compared with the prior art in which the multicarrier signal is received. The configuration of the receiving apparatus can accordingly simplified while at the same time reducing the electric power required for the receiving process.

Also, in the configuration for transmission according to this embodiment, the frequency position for transmission of each multiplexed video program is varied at the transmission of one time slot, so that video program is completely dispersed in the transmission band prepared and transmitted, thereby producing a frequency diversity effect. Also, in the case under consideration, the multiplexed video programs are divided into the former and latter halves, and then are transmitted alternately with each other at one time slot. At the receiving side, therefore, the receiving process and the reception pause are alternated with each other at one time slot intermittently. Thus, the switching of the frequency received can thus be processed during the pause of the receiving process for example, with the result that a superior processing for receiving can be accomplished.

The numerical values of frequency, time, etc. designated in the above-mentioned embodiments represent only an example, and are not limited to those of the embodiments. Also, modulation schemes other than the QPSK modulation of course are applicable. Further, although the above-mentioned embodiments refer to a configuration in which the receiving frequency is switched at one band slot unit at the receiving side and one frequency conversion circuit 132 frequency-converts the receiving signal into the intermediate frequency signal, an alternative scheme can be employed in which, for example the whole one band slot is received in a first-stage frequency conversion circuit and the desired sub-band is extracted by a frequency conversion circuit at the next stage.

Also, instead of the transmission of the television broadcasting to which the above-mentioned embodiments are applied, the invention can be applied to the transmission of various other types of data as well. A possible application, for example, is a broadcasting of an audio signal multiplexed and transmitted.

According to this invention, only the transmission band through which the desired data is transmitted is received at the receiving side in an interlinked relation with the switching operation at the transmitting side, and therefore the desired data can be obtained simply by the processing for receiving the particular band. In this case, the data is transmitted in a form distributed to a plurality of carriers, so that data can be produced efficiently by the multicarrier system. At the same time, since the data is sequentially switched to a plurality of transmission bands and then transmitted, the frequency diversity effect is obtained by the distributive use of a plurality of transmission bands.

In this case, after each data is transmitted during a predetermined time slot period using a predetermined transmission band the transmission of the data is paused for the predetermined time slot period, and then the transmission band is switched to the separate transmission band for transmitting the data during the predetermined time slot period. As a result, the process for switching the frequency band can be performed at the receiving side during the pause period. A superior processing timing thus can be secured while at the same time permitting the separate data to transmit during the pause time period, thereby making a more efficient transmission possible.

In the above-mentioned case, only the time slots for the same data are used for interleaved transmission. The deinterleaving operation at the receiving side, therefore, can be so simplified as to use only the time slot of the required data.

Also, since the process according to the present invention is applied to the transmission system, transmission process or the receiving process for video programs such as those of the television broadcasting, a video transmission system that can transmit a multiplicity of video programs at the same time can be efficiently configured.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

We claim:

1. A receiving apparatus receiving a multi-carrier signal modulated in units of sub-band and a time slot consisting of subcarriers of a predetermined number and subslots thereof, respectively, and modulated by a plurality of desired information units, comprising:

fast Fourier transforming means for subjecting said received multi-carrier signal to a fast Fourier transform;

first processing means for de-interleaving an output signal from said fast Fourier transforming means in a time domain in said sub-band;

demodulating means for demodulating an output signal from said first processing means;

frequency converting means located at a stage preceding said fast Fourier transmitting means for converting a frequency of said received multi-carrier signal into a desired frequency synchronized with said time slot and for catching up a deviation of a position in a frequency domain of each time slot modulated by one of said desired information units; and decoding means for decoding an output signal from said demodulating means, wherein said first processing means further de-interleaves data in a frequency domain in said sub-band, and said fast Fourier transforming means has a fast Fourier transform execution capacity per each predetermined period of a number less than a total number of subcarriers consisting of a band slot of said received multi-carrier signal and equal to or larger than a number of subcarriers consisting of said sub-band.

2. The receiving apparatus according to claim 1, wherein said fast Fourier transforming means and said frequency converting means carry out a fast Fourier transform for alternately changing a source frequency of said frequency converting.

3. The receiving apparatus according to claim 1, wherein said desired information units include a video signal, and said decoding means decodes an encoded video signal.

4. A receiving method for receiving a multi-carrier signal modulated in units of sub-band and a time slot consisting of subcarriers of a predetermined number and subslots thereof, respectively, and modulated by a plurality of desired information units, comprising the steps of:

converting a frequency of said received multi-carrier signal into a desired frequency synchronized with said time slot and for catching up a deviation of a position in a frequency domain of each time slot modulated by one of said desired information units;

fast Fourier transforming said received multi-carrier signal;

de-interleaving an output from said fast Fourier transforming step in a time domain in said sub-band;

demodulating an output from said de-interleaving step; and decoding an output from the step of demodulating, wherein said de-interleaving step further de-interleaves data in a frequency domain in said sub-band, and said fast Fourier transforming step uses a fast Fourier transform execution capacity per each predetermined period of a number less than a total number of subcarriers consisting of a band slot of said received multi-carrier signal and equal to or larger than a number of subcarriers consisting of said sub-band.

5. The receiving method according to claim 4, wherein said fast Fourier transforming step and said converting a frequency step carry out a fast Fourier transform for alternately changing a source frequency of said frequency converting.

6. The receiving method according to claim 4, wherein said desired information units include a video signal and said step of decoding decodes an encoded video signal.

* * * * *